United States Patent
Kim

(10) Patent No.: US 8,214,449 B2
(45) Date of Patent: Jul. 3, 2012

(54) METHOD AND APPARATUS FOR SWITCHING COMMUNICATION CHANNEL IN SHARED MEMORY COMMUNICATION ENVIRONMENT

(75) Inventor: Kang Ho Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 184 days.

(21) Appl. No.: 12/768,503

(22) Filed: Apr. 27, 2010

(65) Prior Publication Data

US 2011/0131289 A1 Jun. 2, 2011

(30) Foreign Application Priority Data

Dec. 1, 2009 (KR) .................. 10-2009-0118061

(51) Int. Cl.
*G06F 15/167* (2006.01)
(52) U.S. Cl. .................. 709/213; 709/212; 709/216
(58) Field of Classification Search .................. None
See application file for complete search history.

(56) References Cited

U.S. PATENT DOCUMENTS

| | | | | |
|---|---|---|---|---|
| 7,792,918 B2* | 9/2010 | Corry et al. | .................. | 709/216 |
| 7,996,484 B2* | 8/2011 | Mundkur et al. | ............. | 709/213 |
| 2010/0199276 A1* | 8/2010 | Umbehocker | .................. | 718/1 |
| 2010/0306381 A1* | 12/2010 | Lublin et al. | .................. | 709/226 |

FOREIGN PATENT DOCUMENTS

| KR | 10-2001-0056756 | 7/2001 |
|---|---|---|
| KR | 10-2003-0008951 | 1/2003 |
| KR | 10-2003-0054102 | 7/2003 |
| KR | 10-2005-0055196 | 6/2005 |

OTHER PUBLICATIONS

"Inter-domain Socket Communications Supporting High Performance and Full Binary Compatibility on Xen", Kangho Kim et al., 2008 ACM, Mar. 5-7, 2008.
"XenLoop: A Transparent High Performance Inter-VM Network Loopback" Jian Wang et al., 2008 ACM, Jun. 23-27, 2008.

* cited by examiner

*Primary Examiner* — John B. Walsh
(74) *Attorney, Agent, or Firm* — Blakely, Sokoloff, Taylor & Zafman

(57) ABSTRACT

A method for switching a communication channel in a shared memory communication environment which sets up a TCP/IP (Transmission Control Protocol/Internet Protocol) communication channel and a shared memory communication channel from a first virtual machine to a second virtual machine, the method includes: transmitting a channel switching message to the first virtual machine when the first virtual machine moves to another physical machine; transmitting the channel switching message from the first virtual machine to the second virtual machine; and switching a channel state between the first virtual machine and the second virtual machine.

16 Claims, 4 Drawing Sheets

METHOD AND APPARATUS FOR SWITCHING COMMUNICATION CHANNEL IN SHARED MEMORY COMMUNICATION ENVIRONMENT

CROSS-REFERENCE(S) TO RELATED APPLICATION(S)

The present invention claims priority of Korean Patent Application No. 10-2009-0118061, filed on Dec. 1, 2009, which is incorporated herein by reference.

FIELD OF THE INVENTION

The present invention relates to a technology for switching a communication channel, and, more particularly, to a method and apparatus for switching a communication channel in a shared memory communication environment which is capable of switching a communication channel from a shared memory communication channel to a communication channel supporting live migration during the execution of an application program.

BACKGROUND OF THE INVENTION

With the advent of virtualization technology, it became possible to manage a plurality of virtual machines in a single physical machine and to install and manage a distributed program in a single physical machine.

Virtual machine technology has been developed with the main focus being placed on virtual machine separation which prevents each virtual machine from influencing other virtual machines when a plurality of virtual machines coexist in a single physical machine. By using this separation technology, a distributed program requiring frequent communication is installed and managed in a plurality of virtual machines of a single physical machine. When a Transmission Control Protocol (TCP)/User Datagram Protocol (UDP)-based communication protocol is used, communication performance is significantly low, so that the performance of the distributed program is considerably poor.

FIG. 1 is a diagram hierarchically representing communication protocol processing software in a general operating system.

First, an operating system, which is an application program (socket application) 10, accesses a protocol processing stack of a kernel area using a library function 12.

In the case of a TCP/IP protocol, data is transmitted to a network device driver 22 through a TCP protocol stack 16 and an IP protocol stack 20. The network device driver 22 transmits the data to an actual network device 24, thereby completing the transmission of the data.

In a virtual machine, only the network device 24 is virtualized, and the higher layer processing procedure remains the same. It is very inefficient to pass through the entire protocol stack in order to transmit data to an adjacent virtual machine (another virtual machine managed in the same physical machine).

In order to solve this problem of communication performance, a communication technology of adopting a communication channel using shared memory between virtual machines was proposed.

As the communication technology using shared memory, a technology for intercepting a communication flow above the TCP protocol stack 16 and enabling actual communication to shared memory and a technology for intercepting a communication flow below the IP protocol stack 20 of the operating system are chiefly used.

The above-described two technologies may be applied without modifying the application program. The former technology requires a slight modification of operating system kernel code, while the latter technology requires no modification of kernel code.

From the viewpoint of performance, the former technology is significantly superior to the latter technology. The former technology has lower packet processing cost and a shorter distance between both communication ends than the latter, since communication packets does not pass through a TCP/IP stack in the former technology while the communication packets must pass through TCP/IP and UDP/IP stacks in the latter technology.

The communication channel using shared memory may be employed only when the two virtual machines at both ends are present on the same physical machine. One of the most important advantages of the use of a virtual machine is that the virtual machine can be moved to another physical machine during the execution thereof, that is, virtual machine live migration can be supported. When a shared memory communication channel is adopted, this advantage is not available.

The latter technology supports live migration by using a method for switching a virtual network interface in which method a virtual machine provides the flow of communication packets immediately before live migration. The former technology does not support live migration yet.

Of the conventional communication channel technologies, the shared memory communication channel includes two pieces of shared memory, and each piece of shared memory is configured in such a way that a single virtual machine allocates actual memory and a counter party virtual machine performs only mapping in its own address space.

The present invention is intended to propose a channel switching technique in shared memory which adopts the above-described technology.

SUMMARY OF THE INVENTION

In view of the above, the present invention provides an apparatus and method which is capable of switching to a communication channel supporting live migration, such as a TCP/IP communication channel, during the execution of an application program when using a shared memory communication channel.

In accordance with a first aspect of the present invention, there is provided a method for switching communication channel in a shared memory communication environment which sets up a TCP/IP (Transmission Control Protocol/Internet Protocol) communication channel and a shared memory communication channel from a first virtual machine to a second virtual machine, the method including:

transmitting a channel switching message to the first virtual machine when the first virtual machine moves to another physical machine;

transmitting the channel switching message from the first virtual machine to the second virtual machine; and switching a channel state between the first virtual machine and the second virtual machine.

In accordance with a second aspect of the present invention, there is provided an apparatus for switching a communication channel in a shared memory communication environment, the apparatus including:

a shared memory communication channel for sharing memory between virtual machines; and a state control unit for managing a state of the virtual machines and controlling a communication flow of the shared memory communication channel in accordance with the managed state of the virtual machines.

BRIEF DESCRIPTION OF THE DRAWINGS

The objects and features of the present invention will become apparent from the following description of embodiments given in conjunction with the accompanying drawings, in which.

DETAILED DESCRIPTION OF THE PREFERRED EMBODIMENTS

Hereinafter, embodiments of the present invention will be described with reference to the accompanying drawings which form a part hereof.

In the present embodiment, a shared memory channel cannot be used for communication between physical machines, so that a communication medium must be capable of communication between physical machines.

The present invention is intended to provide a technology for, in order to support live migration, switching a communication flow from a shared memory channel to a TCP/IP channel while maintaining the flow of communication data during the execution of an application program.

Since the TCP/IP channel causes data to be sequentially transmitted and guarantees that no data is lost during transmission, it is necessary to maintain the integrity of the TCP/IP channel.

The embodiments of the present invention will be described below with reference to the accompanying drawings.

Figure 1:
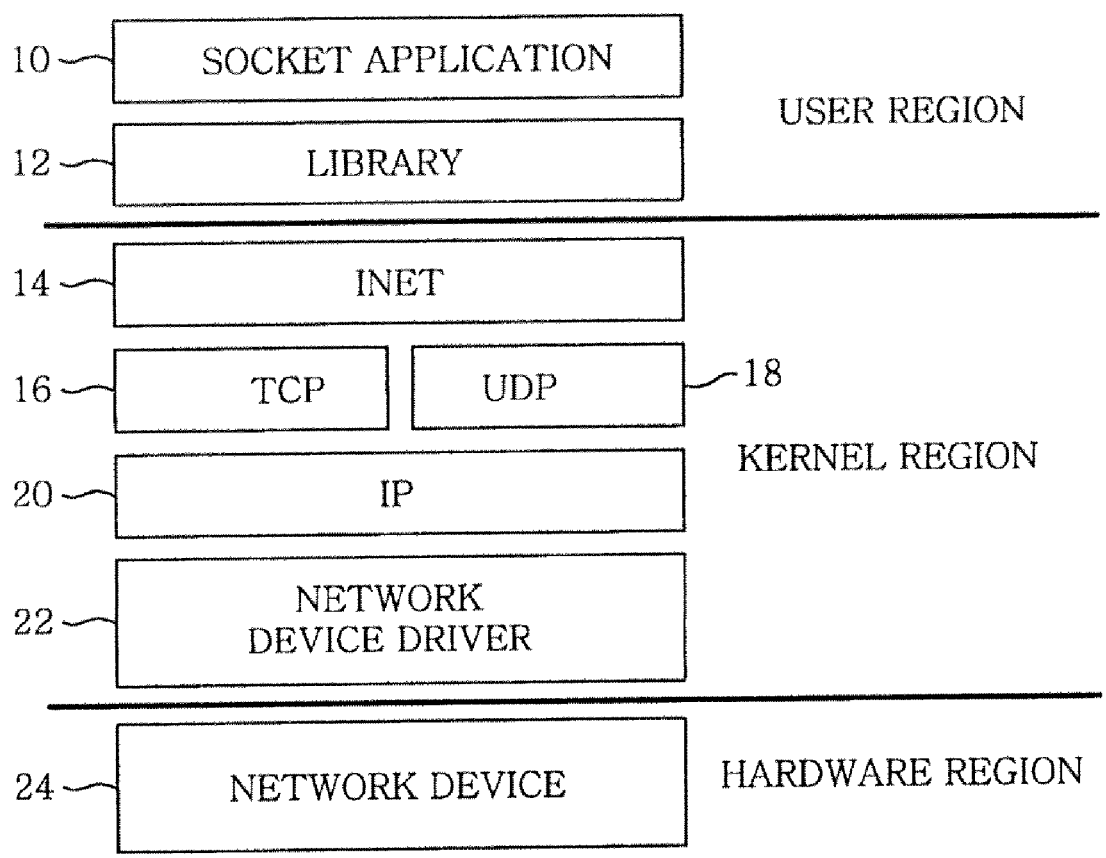
FIG. 1 is a diagram hierarchically representing communication protocol processing software in a typical operating system such as Linux, UNIX or Windows.
Figure 2:
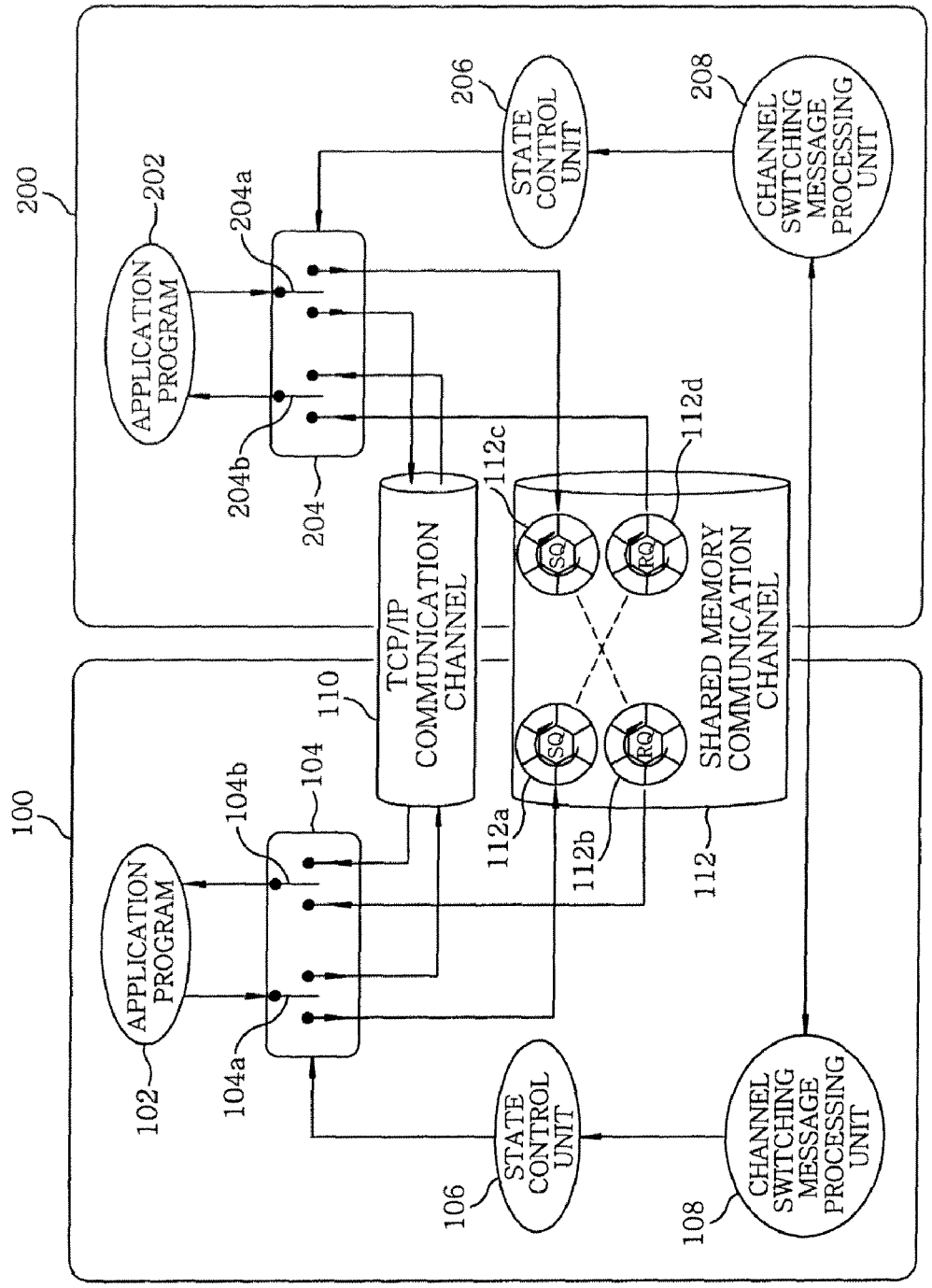
FIG. 2 is a block diagram illustrating a configuration of an apparatus for switching a shared memory communication channel to a TCP/IP channel in accordance with an embodiment of the present invention.

FIG. 2 is a block diagram illustrating a configuration of an apparatus for switching a communication channel in a shared memory communication environment in accordance with an embodiment of the present invention. The apparatus for switching a communication channel includes a first virtual machine 100 and a second virtual machine 200.

The first virtual machine 100 includes a switching unit 104, a state control unit 106, a channel switching message processing unit 108, a TCP/IP communication channel 110 and a shared memory communication channel 112.

The second virtual machine 200 shares the TCP/IP communication channel 110 and the shared memory communication channel 112 with the first virtual machine 100 and has the same configuration and components as those of the first virtual machine 100.

As illustrated in FIG. 2, each of the switching units 104 and 204 may intercept the flow of communication or adjust the flow direction of communication.

The switching unit 104 (or 204) may include a transmission switch 104a (or 204a) and a reception switch 104b (or 204b). The respective switches 104a and 104b (or 204a and 204b) may be controlled by the state control unit 106 (or 206).

The state control unit 106 (or 206) manages states of switches 104a and 104b (or 204a and 204b), and determine the flow of communication by transmitting an appropriate command signal to the switching unit 104 (or 204) and the shared memory communication channel 112 depending on each state. States which may be managed by the state control unit 106 (or 206) are exemplified in FIG. 3.

Figure 3:
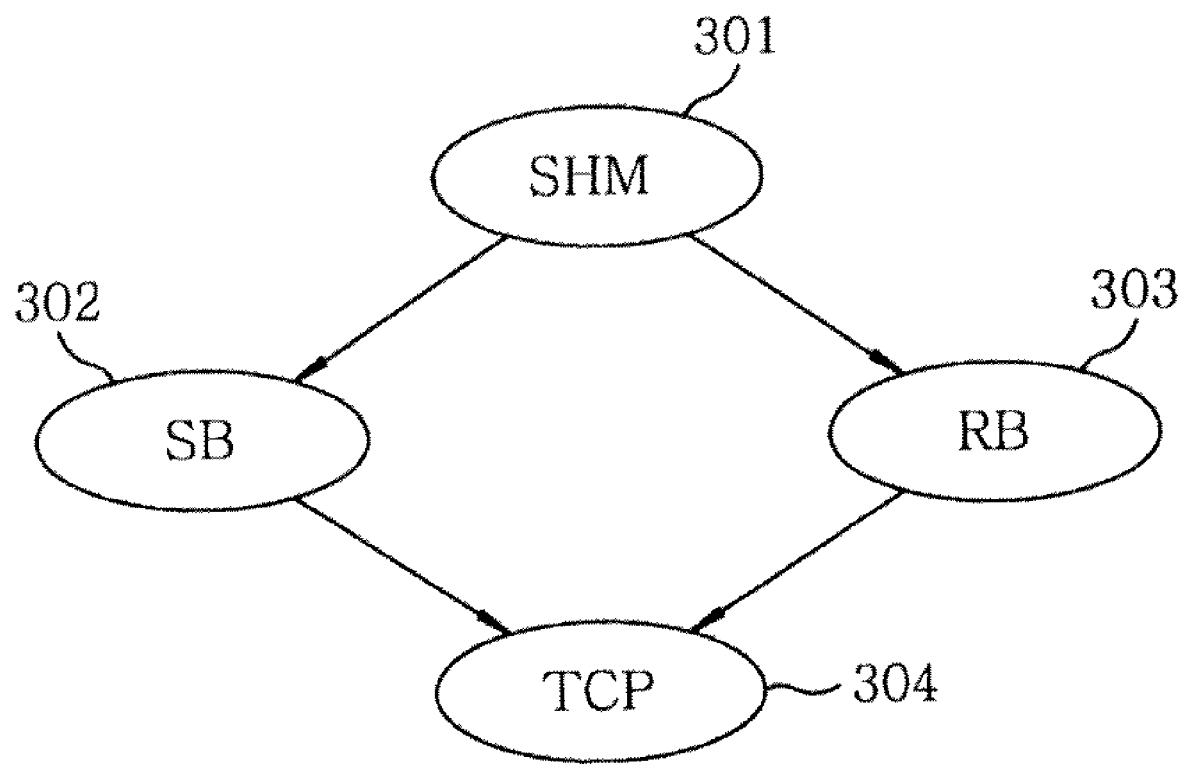
FIG. 3 is a diagram illustrating transitions between respective states in a period from the start of a channel switching to the completion thereof in accordance with the embodiment of the present invention.

FIG. 3 is a diagram illustrating transitions between respective states in a period from the start of a channel switching to the completion thereof. Here, total four states are considered.

Referring to FIG. 3, a state SHM 301 may refer to a state where both of the transmission channel and reception channel of the shared memory communication channel 112 are used in a corresponding virtual machine. A state SB 302 may refer to a state where data transmission is performed through the TCP/IP communication channel 110 because the transmission channel of the shared memory communication channel 112 has been locked. A state RB 303 may refer to a state where data reception is performed through the TCP/IP communication channel 110 because the reception channel has been locked. A state TCP 304 may refer to a state where data transmission and reception are all performed through the TCP/IP communication channel 110 because both of the transmission and reception channel have been locked and a shared memory has been released.

Meanwhile, the channel switching message processing unit 108 (or 208) may transmit a live migration message of a system manager to an associated virtual machine, for example, the first virtual machine 100.

The TCP/IP communication channel 110 corresponds to the shared memory communication channel 112, and provides a communication environment using the TCP/IP-based communication protocol.

The shared memory communication channel has a shared memory between the first virtual machine 100 and the second virtual machine 200, and may include, for example, transmission buffers SQ 112a and 112c and reception buffers RQ 112b and 112d.

Figure 4:
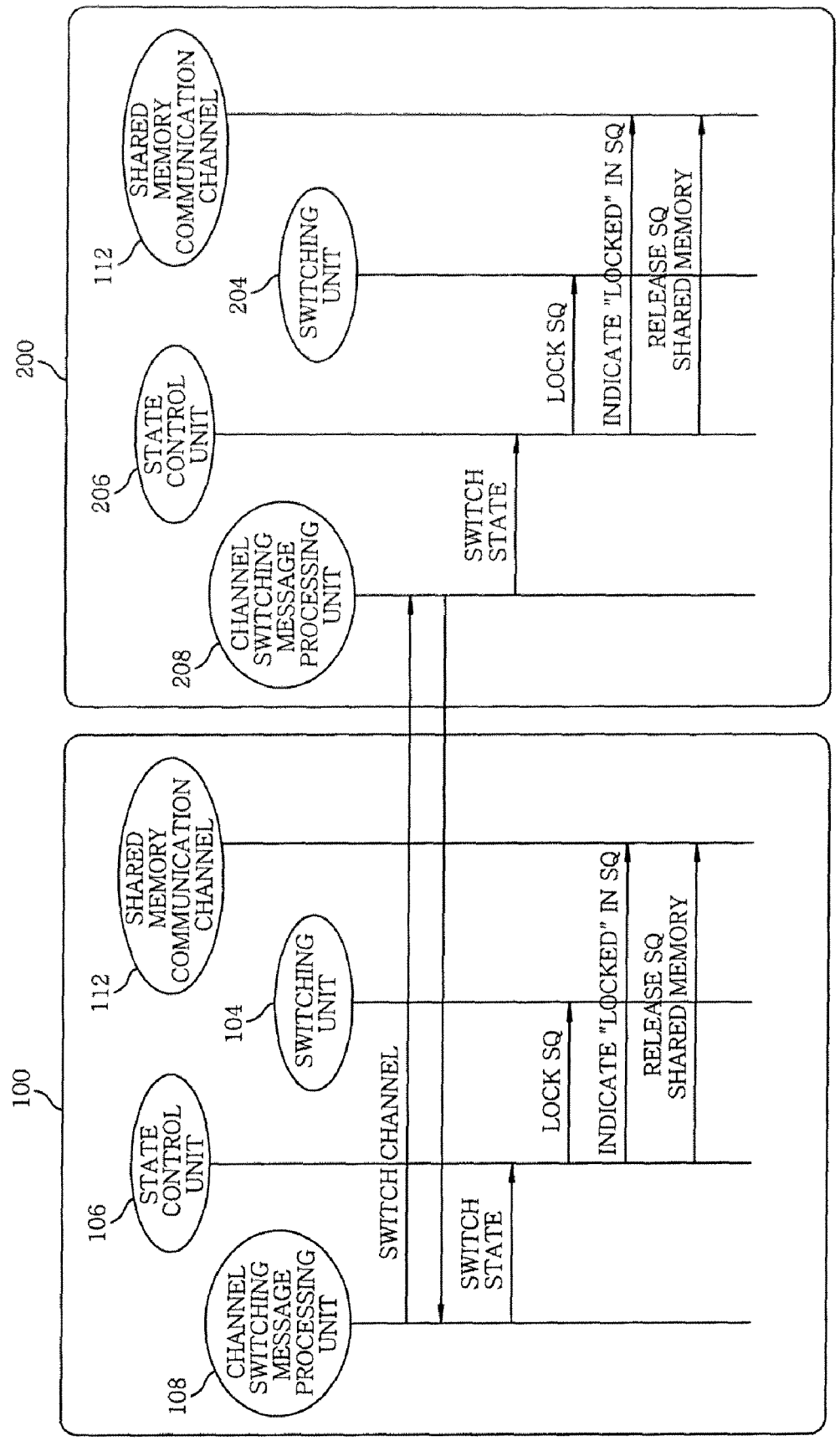
FIG. 4 is a diagram illustrating a method of switching a communication channel before the actual movement of a virtual machine is performed when a system manager has given a command to move a specific virtual machine to another physical machine in accordance with the embodiment of the present embodiment.

FIG. 4 is a diagram illustrating a method of switching a communication channel before the actual movement of a virtual machine is performed when a system manager has given a command to move a specific virtual machine to another physical machine in accordance with the embodiment of the present embodiment.

A method of switching a communication channel in a shared memory communication environment will be described as an example with reference to FIGS. 3 and 4.

First, when the first virtual machine 100 creates a TCP/IP communication channel 110 for communication with the second virtual machine 200, both the TCP/IP communication channel 110 and the shared memory communication channel 112 are created at the same time if the first virtual machine 100 and the second virtual machine 200 are present in the same physical machine.

Even if the TCP/IP communication channel 110 is not used for communication, it will be maintained continuously.

In this case, when a system management unit (not shown) attempts to move the first virtual machine 100 to another physical machine (This is called live migration), the system management unit transmits a channel switching message to the first virtual machine 100.

The first virtual machine 100 may transmit the channel switching message to every virtual machine connected thereto through the shared memory communication channel 112, for example, to the second virtual machine 200, on behalf of a system manager.

The first virtual machine 100 and the second virtual machine 200 having received the channel switching message change states of the state control units 106 and 206 into the state SB 302, and transmit a corresponding manipulation command to the switching unit 104.

The switching unit 104 transmits all of the following transmission data over the TCP/IP communication channel 110.

Thereafter, data remaining in the transmission buffer 112a of the shared memory communication channel 112 is left as it is. A shared memory of the transmission buffer 112a is released at the same time when a transmission path is switched. Here, the release of shared memory refers to the deletion of the shared memory for transmission from a virtual memory region of a virtual machine because the shared memory for transmission is not required any longer. The limitation of live migration due to the shared memory is eliminated by releasing the shared memory as described above.

Thereafter, when the application program 102 requests data reception, the reception buffer 112b of the shared memory communication channel 112 is checked.

If data is present in the reception buffer 112b, the data is transmitted to the application program 102, and a state of the shared memory communication channel 112 is maintained.

If data is not present in the reception buffer 112b (the reception channel is locked), the state is switched to the state RB 303 or TCP 304, and the state control unit 106 switches the flow of reception to the TCP/IP communication channel 110. The following data are all received through the TCP/IP communication channel 110.

Here, the state may be switched to RB 303 when the previous state is SHM 301, and the state may be switched to TCP 304 when the previous state is SB 302.

An application program which only receives data may encounter a state where the reception buffers 112b and 112d are locked and data is not present during reception in an early stage.

This situation may occur in the case where the state still remains at the state SHM 301 since the first virtual machine 100 having transmitted a channel switching message to the second virtual machine 200 according to the procedure of FIG. 4 has processed its transmission buffer 112a but the second virtual machine 200 has not processed the transmission buffer 112c yet. In this case, the state may be switched from an initial state immediately to the state RB 303 without passing through the state SB 302.

In the state RB 303, the transmission buffers 112a and 112c are effective, so that the application program 202 of the second virtual machine 200 can still transmit data through the shared memory communication channel 112.

Meanwhile, when the channel state is SB 302 and if the reception buffers 112b and 112d are empty and a transmission buffer mapped to a counter party has been locked due to the execution of an application program, the channel state may be switched to a TCP channel. For the switch of the channel state, the state control units 106 and 206 switch the flow of the reception of data to the TCP channel.

If the channel state is RB 303, the channel state may be switched to the TCP channel by the state control unit 106 and 206 during the process of receiving and processing a channel switching message. In this case, the flow of data transmission is switched to the TCP channel, after the transmission and reception buffers of the corresponding channel in the state RB 303 have been locked and mapping has been released.

Meanwhile, the locking of the transmission buffer and the release of the shared memory may be indicated in the shared memory itself. The counter party of a connected communication reads the indication of the shared memory, and then determines whether shared memory has been currently set and whether the other party does not transmit data by locking the shared memory and releasing mapping. A virtual machine associated with a channel switching does not use a separate synchronization device. When a defined work is conducted in accordance with each message and state, the channel can be smoothly switched while passing through an intermediate state.

As described above, the present invention supports live migration of a virtual machine by switching a shared memory communication channel to a TCP/IP channel during the execution of an application program. Accordingly, the programmer of the application program can freely choose a communication channel, and the phenomenon of not using shared memory to provide for the live migration of a virtual machine can be prevented. Furthermore, the present invention can reduce interruption of the data flow between application programs by providing an intermediate state during a channel switching. Also, the present invention can be easily applied to an operating system kernel because the channel switching tasks of two virtual machines are not synchronized with each other in a forcible manner.

While the invention has been shown and described with respect to the embodiments, it will be understood by those skilled in the art that various changes and modification may be made without departing from the scope of the invention as defined in the following claims.

What is claimed is:

1. A method for switching a communication channel in a shared memory communication environment, which sets up a TCP/IP (Transmission Control Protocol/Internet Protocol) communication channel and a shared memory communication channel from a first virtual machine to a second virtual machine, the method comprising:
   transmitting a channel switching message to the first virtual machine when the first virtual machine moves to another physical machine;
   transmitting the channel switching message from the first virtual machine to the second virtual machine; and
   switching a channel state between the first virtual machine and the second virtual machine,
   wherein the switched channel state is a state where a transmission channel is locked.

2. The method of claim 1, wherein the movement to another physical machine is live migration.

3. The method of claim 1, wherein, in the state where the transmission channel is locked, data is transmitted through the TCP/IP communication channel.

4. The method of claim 1, further comprising:
   releasing a shared memory of a trans buffer when a transmission path is switched.

5. The method of claim 4, wherein said releasing the shared memory includes deleting shared memory for transmission from virtual memory areas of the first virtual machine and the second virtual machine.

6. The method of claim 4, further comprising:
checking a reception buffer of the shared memory communication channel when data reception is requested by an application program;
if data is present in the reception buffer, transmitting the present data to the application program, and maintaining a state of the shared memory communication channel; and
if data is not present in the reception buffer, switching current state and switching a reception flow to the TCP/IP communication channel.

7. The method of claim 6, wherein the switched state of the current state is a state where a reception channel is locked or a transmission channel and the reception channel are locked.

8. The method of claim 1, further comprising:
switching the channel state between the first virtual machine and the second virtual machine to the TCP/IP communication channel, if a reception buffer of the shared memory communication channel is empty and a transmission buffer mapped to the second virtual machine is locked when the first virtual machine is in a state where a transmission channel is locked.

9. The method of claim 8, further comprising:
switching the channel state between the first virtual machine and the second virtual machine to the TCP/IP communication channel during a process of the received channel switching message if the first virtual machine and the second virtual machine are in a state where a reception channel is locked.

10. An apparatus for switching a communication channel in a shared memory communication environment, the apparatus comprising:
a shared memory communication channel for sharing memory between virtual machines; and
a state control unit for managing a state of the virtual machines and controlling a communication flow of the shared memory communication channel in accordance with the managed state of the virtual machines,
a TCP/IP communication channel corresponding to the shared memory communication channel,
wherein the state control unit selective manages:
a state where the virtual machine uses transmission and reception channels of the shared memory communication channel;
a state where data transmission is performed throe through the TCP/IP communication channel since the transmission channel of the shared memory communication channel has been locked:
a state where data reception is performed through the TCP/IP communication channel since the reception channel of the shared memory communication channel has been locked; and
a state where data transmission and reception are performed through the TCP/IP communication channel since the transmission and reception channels of the shared memory communication channel have been locked and a shared memory communication channel has been released.

11. The apparatus of claim 10, wherein the state control unit switches the communication channel from the shared memory communication channel to the TCP/IP communication channel when one virtual machine moves to another physical machine.

12. The apparatus claim 11, wherein the apparatus switches the shared memory communication channel to the TCP/IP communication channel while supporting live migration during an execution of an application program.

13. The apparatus of claim 10, wherein the TCP/IP communication channel uses a TCP/IP-based communication protocol.

14. The apparatus of claim 10, further comprising a channel switching message processing unit for transmitting a live migration message of a system manager to the virtual machines.

15. The apparatus of claim 10, wherein the switching unit includes:
a transmission switch for performing switching so as to deliver a transmission signal from an application program; and
a reception switch for performing switching so as to deliver a reception signal to the application program.

16. The apparatus of claim 10, wherein the shared memory communication channel includes a transmission buffer and a reception buffer.

* * * * *